United States Patent
Zhao et al.

(10) Patent No.: US 8,577,415 B2
(45) Date of Patent: Nov. 5, 2013

(54) WIRELESS COMMUNICATION SYSTEM AND WIRELESS NETWORK ACCESSING DEVICE

(75) Inventors: Shiqing Zhao, Huizhou (CN); Dexiang Edward Luo, Huizhou (CN); Xuelong Ronald Hu, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 0 days.

(21) Appl. No.: 13/519,133

(22) PCT Filed: May 4, 2012

(86) PCT No.: PCT/CN2012/075089
§ 371 (c)(1),
(2), (4) Date: Jun. 26, 2012

(65) Prior Publication Data
US 2013/0260830 A1    Oct. 3, 2013

(51) Int. Cl.
*H04M 1/00* (2006.01)
*H04B 1/38* (2006.01)

(52) U.S. Cl.
USPC .......................................... 455/558; 455/559

(58) Field of Classification Search
USPC .................. 455/558, 559, 415, 420
See application file for complete search history.

(56) References Cited

U.S. PATENT DOCUMENTS

| | | | |
|---|---|---|---|
| 7,706,839 B2 * | 4/2010 | Ueno | 455/558 |
| 2012/0322503 A1 * | 12/2012 | Liu et al. | 455/558 |

* cited by examiner

*Primary Examiner* — Charles Appiah
*Assistant Examiner* — Emem Stephen
(74) *Attorney, Agent, or Firm* — Cheng-Ju Chiang

(57) ABSTRACT

A wireless communication system and a wireless network accessing device are disclosed. The wireless communication system comprises an intelligent terminal and a wireless network accessing device. The intelligent terminal comprises a first card holder and a first interface. The first card holder is configured to receive a first SIM card, and the first interface is electrically connected to the first card holder. The wireless network accessing device comprises a second card holder, a second interface, a baseband chip and a switch module. The second card holder is configured to receive a second SIM card, the second interface is removably electrically connected to the first interface, and the switch module is electrically connected to the second card holder, the second interface and the baseband chip so that the baseband chip is selectively electrically connected to the first card holder or the second card holder.

16 Claims, 1 Drawing Sheet

WIRELESS COMMUNICATION SYSTEM AND WIRELESS NETWORK ACCESSING DEVICE

CROSS REFERENCE TO RELATED APPLICATIONS

The present application is a 35 U.S.C. §371 National Phase conversion of International (PCT) Patent Application No. PCT/CN2012/075089, filed on May 4, 2012, the disclosure of which is incorporated by reference herein. The PCT International Patent Application was filed in Chinese.

FIELD OF THE INVENTION

The present disclosure generally relates to the field of communication, and more particularly, to a wireless communication system and a wireless network accessing device.

BACKGROUND OF THE INVENTION

With continuous advancement of the wireless network technologies, various external wireless network accessing devices (e.g., wireless network card) which can impart a wireless network accessing function to an intelligent terminal have appeared. Taking an intelligent terminal (e.g., a tablet computer, an MIFI or the like) comprising a Mini-PCIe interface and supporting the LTE or 3G network accessing function as an example, the wireless network accessing device and the intelligent terminal each adopt a standard Mini-PCIe interface. The Mini-PCIe interface is a 52-pin interface which provides signal transmission channels necessary for an SIM card, so the SIM card can be disposed on a mainboard of the intelligent terminal. In this case, as the SIM card is disposed on the mainboard of the intelligent terminal, the wireless network accessing device must be connected to the mainboard of the intelligent terminal via the Mini-PCIe interface in order to operate normally. This makes the wireless network accessing device unable to operate independently, which is inconvenient in use.

SUMMARY OF THE INVENTION

A primary objective of the present disclosure is to provide a wireless communication system and a wireless network accessing device that are compatible with two different cases in which an SIM card is disposed in an intelligent terminal and in which an SIM card is disposed in the wireless network accessing device.

To achieve the aforesaid objective, the present disclosure provides a wireless communication system, which comprises an intelligent terminal and a wireless network accessing device. The intelligent terminal comprises a first circuit board, and a first card holder and a first interface disposed on the first circuit board. The first card holder is configured to receive a first SIM card, and the first interface is electrically connected to the first card holder. The wireless network accessing device comprises a second circuit board, and a second card holder, a second interface, a baseband chip and a switch module disposed on the second circuit board. The second card holder is configured to receive a second SIM card, the second interface is removably electrically connected to the first interface, and the switch module is electrically connected to the second card holder, the second interface and the baseband chip so that the baseband chip is selectively electrically connected to the first card holder or the second card holder for purpose of wireless network accessing through the first SIM card or the second SIM card. The switch module comprises a plurality of switch units, each of the switch units comprises a movable terminal, a first stationary terminal and a second stationary terminal, the movable terminal is electrically connected to the first stationary terminal in a first status and to the second stationary terminal in a second status, the movable terminal is electrically connected to the baseband chip, the first stationary terminal is electrically connected to the first card holder via the first interface and the second interface, and the second stationary terminal is electrically connected to the second card holder. The wireless network accessing device is inserted into the interior of the intelligent terminal from the exterior of the intelligent terminal, and when the wireless network accessing device is inserted into the interior of the intelligent terminal, the first circuit board and the second circuit board are in a same plane.

To achieve the aforesaid objective, the present disclosure further provides a wireless communication system, which comprises an intelligent terminal and a wireless network accessing device. The intelligent terminal comprises a first card holder and a first interface. The first card holder is configured to receive a first SIM card, and the first interface is electrically connected to the first card holder. The wireless network accessing device comprises a second card holder, a second interface, a baseband chip and a switch module. The second card holder is configured to receive a second SIM card, the second interface is removably electrically connected to the first interface, and the switch module is electrically connected to the second card holder, the second interface and the baseband chip so that the baseband chip is selectively electrically connected to the first card holder or the second card holder for purpose of wireless network accessing through the first SIM card or the second SIM card.

Preferably, the switch module comprises a plurality of switch units, each of the switch units comprises a movable terminal, a first stationary terminal and a second stationary terminal, the movable terminal is electrically connected to the first stationary terminal in a first status and to the second stationary terminal in a second status, the movable terminal is electrically connected to the baseband chip, the first stationary terminal is electrically connected to the first card holder via the first interface and the second interface, and the second stationary terminal is electrically connected to the second card holder.

Preferably, the switch module further comprises a control terminal, and the control terminal is electrically connected to the baseband chip to control connections between the movable terminal and the first stationary terminal and the second stationary terminal of each of the plurality of switch units.

Preferably, the intelligent terminal further comprises a central processing unit (CPU), and the CPU is electrically connected to the baseband chip via the first interface and the second interface to control connections between the movable terminal and the first stationary terminal and the second stationary terminal of each of the plurality of switch units via the baseband chip.

Preferably, the CPU further determines whether the first SIM card is disposed within the first card holder and whether the second SIM card is disposed within the second card holder according to data obtained by the baseband chip through the first card holder and the second card holder.

Preferably, the first SIM card comprises a first power supply terminal, a first clock terminal, a first reset terminal and a first data terminal, the first card holder comprises four first lead terminals which correspond to the first power supply terminal, the first clock terminal, the first reset terminal and the first data terminal respectively, the four first lead terminals are electrically connected to the first stationary terminals of four of the switch units via the first interface and the second interface respectively, the second SIM card comprises a second power supply terminal, a second clock terminal, a second reset terminal and a second data terminal, the second card holder comprises four second lead terminals which correspond to the second power supply terminal, the second clock terminal, the second reset terminal and the second data terminal respectively, and the four second lead terminals are electrically connected to the second stationary terminals of the four switch units respectively.

Preferably, the four switch units are a four-pole double-throw switch.

Preferably, the first interface and the second interface are each a Mini-PCIe interface, and the wireless network accessing device is a wireless network accessing device having a LTE or 3G wireless network accessing function.

Preferably, the wireless network accessing device is inserted into the interior of the intelligent terminal from the exterior of the intelligent terminal.

Preferably, the intelligent terminal further comprises a first circuit board on which the first card holder and the first interface are disposed, the wireless network accessing device further comprises a second circuit board on which the second card holder, the second interface, the baseband chip and the switch module are disposed, and when the wireless network accessing device is inserted into the interior of the intelligent terminal, the first circuit board and the second circuit board are in a same plane.

To achieve the aforesaid objective, the present disclosure further provides a wireless network accessing device, which is configured to impart a wireless network accessing function to an intelligent terminal. The intelligent terminal comprises a first card holder and a first interface. The first card holder is configured to receive a first SIM card, and the first interface is electrically connected to the first card holder. The wireless network accessing device comprises a second card holder, a second interface, a baseband chip and a switch module. The second card holder is configured to receive a second SIM card. The second interface is removably electrically connected to the first interface. The switch module is electrically connected to the second card holder, the second interface and the baseband chip so that the baseband chip is selectively electrically connected to the first card holder or the second card holder for purpose of wireless network accessing through the first SIM card or the second SIM card.

Preferably, the switch module comprises a plurality of switch units, each of the switch units comprises a movable terminal, a first stationary terminal and a second stationary terminal, the movable terminal is electrically connected to the first stationary terminal in a first status and to the second stationary terminal in a second status, the movable terminal is electrically connected to the baseband chip, the first stationary terminal is electrically connected to the first card holder via the first interface and the second interface, and the second stationary terminal is electrically connected to the second card holder.

Preferably, the switch module further comprises a control terminal, and the control terminal is electrically connected to the baseband chip to control connections between the movable terminal and the first stationary terminal and the second stationary terminal of each of the plurality of switch units.

Preferably, the intelligent terminal further comprises a CPU, and the CPU is electrically connected to the baseband chip via the first interface and the second interface to control connections between the movable terminal and the first stationary terminal and the second stationary terminal of each of the plurality of switch units via the baseband chip.

Preferably, the CPU further determines whether the first SIM card is disposed within the first card holder and whether the second SIM card is disposed within the second card holder according to data obtained by the baseband chip through the first card holder and the second card holder.

Preferably, the first SIM card comprises a first power supply terminal, a first clock terminal, a first reset terminal and a first data terminal, the first card holder comprises four first lead terminals which correspond to the first power supply terminal, the first clock terminal, the first reset terminal and the first data terminal respectively, the four first lead terminals are electrically connected to the first stationary terminals of four of the switch units via the first interface and the second interface respectively, the second SIM card comprises a second power supply terminal, a second clock terminal, a second reset terminal and a second data terminal, the second card holder comprises four second lead terminals which correspond to the second power supply terminal, the second clock terminal, the second reset terminal and the second data terminal respectively, and the four second lead terminals are electrically connected to the second stationary terminals of the four switch units respectively.

Preferably, the four switch units are a four-pole double-throw switch.

Preferably, the first interface and the second interface are each a Mini-PCIe interface, and the wireless network accessing device is a wireless network accessing device having a LTE or 3G wireless network accessing function.

Preferably, the wireless network accessing device is inserted into the interior of the intelligent terminal from the exterior of the intelligent terminal, the intelligent terminal further comprises a first circuit board on which the first card holder and the first interface are disposed, the wireless network accessing device further comprises a second circuit board on which the second card holder, the second interface, the baseband chip and the switch module are disposed, and when the wireless network accessing device is inserted into the interior of the intelligent terminal, the first circuit board and the second circuit board are in a same plane.

As compared to the prior art, the present disclosure has the following benefits: the baseband chip can be electrically connected to the first card holder or the second card holder selectively by means of the switch module, thereby making the wireless communication system compatible with two different cases in which an SIM card is disposed in the intelligent terminal and in which an SIM card is disposed in the wireless network accessing device.

DETAILED DESCRIPTION OF THE INVENTION

Figure 1:
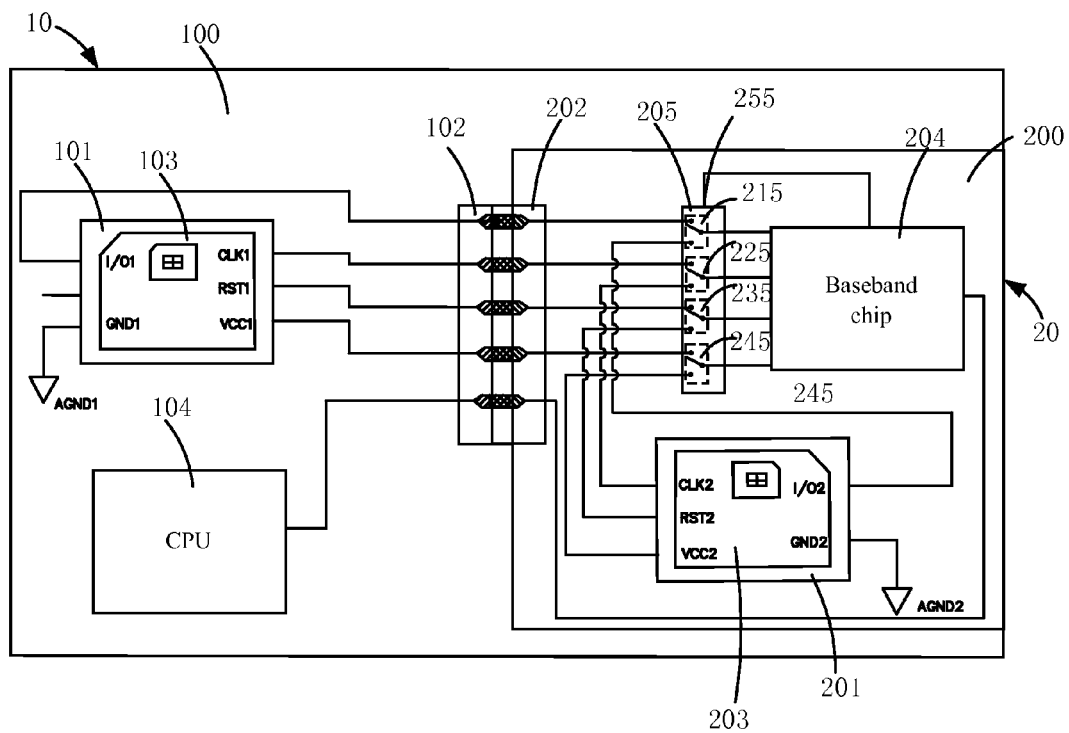
FIG. 1 is a schematic block diagram illustrating a first embodiment of a wireless communication system according to the present disclosure.

Referring to FIG. 1, there is shown a schematic block diagram illustrating a first embodiment of a wireless communication system according to the present disclosure.

As shown in FIG. 1, the first embodiment of the wireless communication system according to the present disclosure comprises an intelligent terminal 10 and a wireless network accessing device 20.

The intelligent terminal 10 comprises a first card holder 101, a first interface 102 and a central processing unit (CPU) 104. The first card holder 101 is configured to receive a first SIM card 103, and the first interface 102 is electrically connected to the first card holder 101.

The first SIM card 103 comprises a first power supply terminal VCC1, a first clock terminal CLK1, a first reset terminal RST1, a first data terminal I/O1 and a first ground terminal GND1. The first card holder 101 comprises a plurality of first lead terminals (not labeled). Four of the plurality of first lead terminals correspond to and, when the first SIM card 103 is disposed in the first card holder 101, are electrically connected to the first power supply terminal VCC1, the first clock terminal CLK1, the first reset terminal RST1 and the first data terminal I/O1 respectively. The four first lead terminals are further electrically connected to corresponding pins (not labeled) in the first interface 102 respectively. Furthermore, the first card holder 101 further comprises a first lead terminal corresponding to the first ground terminal GND1, which is electrically connected to the first ground terminal GND1 when the first SIM card 103 is disposed in the first card holder 101. This first lead terminal is further connected to a common ground AGND1 of the intelligent terminal 10.

The wireless network accessing device 20 comprises a second card holder 201, a second interface 202, a baseband chip 204 and a switch module 205. The second card holder 201 is configured to receive a second SIM card 203, and the second interface 202 is removably electrically connected to the first interface 102. The switch module 205 is electrically connected to the second card holder 201, the second interface 202 and the baseband chip 204 so that the baseband chip 204 is selectively electrically connected to the first card holder 101 or the second card holder 201 for purpose of wireless network accessing through the first SIM card 103 or the second SIM card 203. Here, by "the baseband chip 204 is selectively electrically connected to the first card holder 101 or the second card holder 201", it means that the baseband chip 204 is electrically connected to the first card holder 101 in a first status and to the second card holder 201 in a second status.

In this embodiment, each of the first interface 102 and the second interface 202 is preferably a Mini-PCIe interface, and the wireless network accessing device 20 is preferably a wireless network accessing device having a LTE or 3G wireless network accessing function. In other embodiments, the first interface 102 and the second interface 202 may be other standard or customized interfaces as needed, and the wireless network accessing device 20 may also be a wireless network accessing device having other wireless network accessing functions.

The second SIM card 203 comprises a second power supply terminal VCC2, a second clock terminal CLK2, a second reset terminal RST2, a second data terminal I/O2 and a second ground terminal GND2. The second card holder 201 comprises a plurality of second lead terminals (not labeled). Four of the plurality of second lead terminals correspond to and, when the second SIM card 203 is disposed in the second card holder 201, are electrically connected to the second power supply terminal VCC2, the second clock terminal CLK2, the second reset terminal RST2 and the second data terminal I/O2 respectively. Furthermore, the second card holder 201 further comprises a second lead terminal corresponding to the second ground terminal GND2, which is electrically connected to the second ground terminal GND2 when the second SIM card 203 is disposed in the second card holder 201. This second lead terminal is further connected to a common ground AGND2 of the wireless network accessing device 20.

The switch module 205 comprises four switch units 215, 225, 235 and 245. Each of the switch units 215, 225, 235 and 245 comprises a movable terminal (not labeled), a first stationary terminal (not labeled) and a second stationary terminal (not labeled). The movable terminals of the four switch units 215, 225, 235 and 245 are electrically connected to the baseband chip 204 respectively and, specifically, connected to four terminals of the baseband chip 204 correspondingly. The first stationary terminals of the four switch units 215, 225, 235 and 245 are electrically connected to the first card holder 101 via the first interface 102 and the second interface 202. Specifically, the first stationary terminals of the four switch units 215, 225, 235 and 245 are connected to corresponding pins (not labeled) of the second interface 202 respectively, and, after the second interface 202 is removably electrically connected to the first interface 102, are electrically connected to the four first lead terminals of the first card holder 101 that correspond to the first power supply terminal VCC1, the first clock terminal CLK1, the first reset terminal RST1 and the first data terminal I/O1 of the first SIM card 103 respectively. The second stationary terminals of the four switch units 215, 225, 235 and 245 are electrically connected to the second card holder 201. Specifically, the second stationary terminals of the four switch units 215, 225, 235 and 245 are electrically connected to the four second lead terminals of the second card holder 201 that correspond to the second power supply terminal VCC2, the second clock terminal CLK2, the second reset terminal RST2 and the second data terminal I/O2 of the second SIM card 203 respectively.

The movable terminal of each of the four switch units 215, 225, 235 and 245 is electrically connected to the first stationary terminal of the switch unit 215, 225, 235 or 245 in the first status and to the second stationary terminal of the switch unit 215, 225, 235 or 245 in the second status. Thereby, the baseband chip 204 can be electrically connected to the first card holder 101 or the second card holder 201 selectively.

The switch module 205 further comprises a control terminal 255. The control terminal 255 is electrically connected to the baseband chip 204 to control connections between the movable terminal and the first stationary terminal and the second stationary terminal of each of the four switch units 215, 225, 235 and 245. It is worth noting that, the four switch units 215, 225, 235 and 245 are a four-pole double-throw switch in this embodiment, and may also be other selection switches (e.g., MOS transistors) in other embodiments. Furthermore, there are four switch units 215, 225, 235 and 245 in this embodiment; however, the number of the switch units may be determined as desired according to actual requirements in other embodiments.

The CPU 104 is further electrically connected to the baseband chip 204 via the first interface 102 and the second interface 202 to control connections between the movable terminal and the first stationary terminal and the second stationary terminal of each of the four switch units 215, 225, 235 and 245 via the baseband chip 204. Furthermore, the CPU 104 can further determine whether the first SIM card 103 is disposed within the first card holder 101 and whether the second SIM card 203 is disposed within the second card holder 201 according to data obtained by the baseband chip 204 through the first card holder 101 and the second card holder 201. Specifically, the CPU 104 can control, via the baseband chip 204, the movable terminal and the first stationary terminal of each of the four switch units 215, 225, 235 and 245 to be electrically connected with each other so that the baseband chip 204 is electrically connected to the first card holder 101. In this case, if data (e.g., subscriber identification data) corresponding to the first SIM card 103 can be obtained by the baseband chip 204 from the first card holder 101, then it represents that the first SIM card 103 has already been disposed in the first card holder 101. Otherwise, if the data corresponding to the first SIM card 103 cannot be obtained by the baseband chip 204 from the first card holder 101, then it represents that the first SIM card 103 is not disposed in the first card holder 101. Then, the CPU 104 can control, via the baseband chip 204, the movable terminal and the second stationary terminal of each of the four switch units 215, 225, 235 and 245 to be electrically connected with each other so that the baseband chip 204 is electrically connected to the second card holder 201; and whether the second SIM card 203 is disposed within the second card holder 201 is determined in the similar way. Of course, as will be appreciated by people skilled in the art, the switching process and the determining process described above may be implemented by the baseband chip 204 independently, and only the determination result is sent to the CPU 104.

Figure 2:
FIG. 2 is a schematic view illustrating positional relationships between a first mainboard and a second mainboard of the first embodiment of the wireless communication system according to the present disclosure.

Referring further to FIG. 2, there is shown a schematic view illustrating positional relationships between a first mainboard and a second mainboard of the first embodiment of the wireless communication system according to the present disclosure. As shown in FIG. 1 and FIG. 2, the intelligent terminal 10 further comprises a first circuit board 100 on which the first card holder 101, the first interface 102, the CPU 104 and other components are disposed. The wireless network accessing device 20 further comprises a second circuit board 200 on which the second card holder 201, the second interface 202, the baseband chip 204, the switch module 205 and other components are disposed. In a preferred embodiment, the wireless network accessing device 20 may be inserted into the interior of the intelligent terminal 10 from the exterior of the intelligent terminal 10 and, for example, may be inserted into the interior of the intelligent terminal 10 through an opening formed in a housing of the intelligent terminal 10. When the wireless network accessing device 20 is inserted into the interior of the intelligent terminal 10, the first circuit board 100 and the second circuit board 200 are preferably in a same plane (as shown in FIG. 2), and this can sufficiently reduce the overall thickness of the intelligent terminal 10.

In the process of using the aforesaid wireless communication system, the wireless network accessing device 20 is firstly inserted into the interior of the intelligent terminal 10 from the exterior of the intelligent terminal 10, with the first interface 102 of the intelligent terminal 10 being electrically connected with the second interface 202 of the wireless network accessing device 20. Then, the switch module 205 is controlled by the CPU 104 via the baseband chip 204 or by the baseband chip 204 independently to electrically connect the baseband chip 204 to the first card holder 101 and the second card holder 201 respectively and to determine whether an SIM card is disposed in the first card holder 101 and the second card holder 201. If one of the first card holder 101 and the second card holder 201 is provided with an SIM card therein, then the switch module 205 can be directly controlled to electrically connect the baseband chip 204 to this card holder for purpose of wireless network accessing. If the first card holder 101 and the second card holder 201 are both provided with an SIM card therein, then the CPU 104 prompts a user through a display screen (not shown) of the intelligent terminal 10 to make a choice and, according to the user's choice, electrically connects the baseband chip 204 to the card holder chosen by the user for purpose of wireless network accessing.

In this way, the baseband chip can be electrically connected to the first card holder or the second card holder selectively by means of the switch module, thereby making the wireless communication system of the present disclosure compatible with two different cases in which an SIM card is disposed in the intelligent terminal and in which an SIM card is disposed in the wireless network accessing device.

What described above are only some of the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. A wireless communication system, comprising:
    an intelligent terminal, comprising a first circuit board, and a first card holder and a first interface disposed on the first circuit board, wherein the first card holder is configured to receive a first subscriber identity module (SIM) card, and the first interface is electrically connected to the first card holder; and
    a wireless network accessing device, comprising a second circuit board, and a second card holder, a second interface, a baseband chip and a switch module disposed on the second circuit board, wherein the second card holder is configured to receive a second SIM card, the second interface is removably electrically connected to the first interface, and the switch module is electrically connected to the second card holder, the second interface and the baseband chip so that the baseband chip is selectively electrically connected to the first card holder or the second card holder for purpose of wireless network accessing through the first SIM card or the second SIM card;
    wherein the switch module comprises a plurality of switch units, each of the switch units comprises a movable terminal, a first stationary terminal and a second stationary terminal, the movable terminal is electrically connected to the first stationary terminal in a first status and to the second stationary terminal in a second status, the movable terminal is electrically connected to the baseband chip, the first stationary terminal is electrically connected to the first card holder via the first interface and the second interface, and the second stationary terminal is electrically connected to the second card holder; and
    wherein the wireless network accessing device is inserted into an interior of the intelligent terminal from an exterior of the intelligent terminal, and when the wireless network accessing device is inserted into the interior of the intelligent terminal, the first circuit board and the second circuit board are in a same plane.

2. A wireless communication system, comprising: an intelligent terminal, comprising a first card holder and a first interface, wherein the first card holder is configured to receive a first subscriber identity module (SIM) card, and the first interface is electrically connected to the first card holder; and a wireless network accessing device, comprising a second card holder, a second interface, a baseband chip and a switch module, wherein the second card holder is configured to receive a second SIM card, the second interface is removably electrically connected to the first interface, and the switch module is electrically connected to the second card holder, the second interface and the baseband chip so that the baseband chip is selectively electrically connected to the first card holder or the second card holder for purpose of wireless network accessing through the first SIM card or the second SIM card, wherein the switch module comprises a plurality of switch units, each of the switch units comprises a movable terminal, a first stationary terminal and a second stationary terminal, the movable terminal is electrically connected to the first stationary terminal in a first status and to the second stationary terminal in a second status, the movable terminal is electrically connected to the baseband chip, the first stationary terminal is electrically connected to the first card holder via the first interface and the second interface, and the second stationary terminal is electrically connected to the second card holder, wherein the first SIM card comprises a first power supply terminal, a first clock terminal, a first reset terminal and a first data terminal, the first card holder comprises four first lead terminals which correspond to the first power supply terminal, the first clock terminal, the first reset terminal and the first data terminal respectively, the four first lead terminals are electrically connected to the first stationary terminals of four of the switch units via the first interface and the second interface respectively, the second SIM card comprises a second power supply terminal, a second clock terminal, a second reset terminal and a second data terminal, the second card holder comprises four second lead terminals which correspond to the second power supply terminal, the second clock terminal, the second reset terminal and the second data terminal respectively, and the four second lead terminals are electrically connected to the second stationary terminals of the four switch units respectively.

3. The wireless communication system of claim 2, wherein the switch module further comprises a control terminal, and the control terminal is electrically connected to the baseband chip to control connections between the movable terminal and the first stationary terminal and the second stationary terminal of each of the plurality of switch units.

4. The wireless communication system of claim 3, wherein the intelligent terminal further comprises a central processing unit (CPU), and the CPU is electrically connected to the baseband chip via the first interface and the second interface to control the connections between the movable terminal and the first stationary terminal and the second stationary terminal of each of the plurality of switch units via the baseband chip.

5. The wireless communication system of claim 4, wherein the CPU further determines whether the first SIM card is disposed within the first card holder and whether the second SIM card is disposed within the second card holder according to data obtained by the baseband chip through the first card holder and the second card holder.

6. The wireless communication system of claim 2, wherein the four switch units are a four-pole double-throw switch.

7. The wireless communication system of claim 2, wherein the first interface and the second interface are each a Mini-PCIe interface, and the wireless network accessing device is a wireless network accessing device having a LTE or 3G wireless network accessing function.

8. The wireless communication system of claim 2, wherein the wireless network accessing device is inserted into an interior of the intelligent terminal from an exterior of the intelligent terminal.

9. The wireless communication system of claim 8, wherein the intelligent terminal further comprises a first circuit board on which the first card holder and the first interface are disposed, the wireless network accessing device further comprises a second circuit board on which the second card holder, the second interface, the baseband chip and the switch module are disposed, and when the wireless network accessing device is inserted into the interior of the intelligent terminal, the first circuit board and the second circuit board are in a same plane.

10. A wireless network accessing device, being configured to impart a wireless network accessing function to an intelligent terminal, the intelligent terminal comprising a first card holder and a first interface, the first card holder being configured to receive a first subscriber identity module (SIM) card, and the first interface being electrically connected to the first card holder, wherein the wireless network accessing device comprises a second card holder, a second interface, a baseband chip and a switch module, the second card holder is configured to receive a second SIM card, the second interface is removably electrically connected to the first interface, and the switch module is electrically connected to the second card holder, the second interface and the baseband chip so that the baseband chip is selectively electrically connected to the first card holder or the second card holder for purpose of wireless network accessing through the first SIM card or the second SIM card, wherein the switch module comprises a plurality of switch units, each of the switch units comprises a movable terminal, a first stationary terminal and a second stationary terminal, the movable terminal is electrically connected to the first stationary terminal in a first status and to the second stationary terminal in a second status, the movable terminal is electrically connected to the baseband chip, the first stationary terminal is electrically connected to the first card holder via the first interface and the second interface, and the second stationary terminal is electrically connected to the second card holder, wherein the first SIM card comprises a first power supply terminal, a first clock terminal, a first reset terminal and a first data terminal, the first card holder comprises four first lead terminals which correspond to the first power supply terminal, the first clock terminal, the first reset terminal and the first data terminal respectively, the four first lead terminals are electrically connected to the first stationary terminals of four of the switch units via the first interface and the second interface respectively, the second SIM card comprises a second power supply terminal, a second clock terminal, a second reset terminal and a second data terminal, the second card holder comprises four second lead terminals which correspond to the second power supply terminal, the second clock terminal, the second reset terminal and the second data terminal respectively, and the four second lead terminals are electrically connected to the second stationary terminals of the four switch units respectively.

11. The wireless network accessing device of claim 10, wherein the switch module further comprises a control terminal, and the control terminal is electrically connected to the baseband chip to control connections between the movable terminal and the first stationary terminal and the second stationary terminal of each of the plurality of switch units.

12. The wireless network accessing device of claim 11, wherein the intelligent terminal further comprises a CPU, and the CPU is electrically connected to the baseband chip via the first interface and the second interface to control the connections between the movable terminal and the first stationary terminal and the second stationary terminal of each of the plurality of switch units via the baseband chip.

13. The wireless network accessing device of claim 12, wherein the CPU further determines whether the first SIM card is disposed within the first card holder and whether the second SIM card is disposed within the second card holder according to data obtained by the baseband chip through the first card holder and the second card holder.

14. The wireless network accessing device of claim 10, wherein the four switch units are a four-pole double-throw switch.

15. The wireless network accessing device of claim 10, wherein the first interface and the second interface are each a Mini-PCIe interface, and the wireless network accessing device is a wireless network accessing device having a LTE or 3G wireless network accessing function.

16. The wireless network accessing device of claim 10, wherein the wireless network accessing device is inserted into an interior of the intelligent terminal from an exterior of the intelligent terminal, the intelligent terminal further comprises a first circuit board on which the first card holder and the first interface are disposed, the wireless network accessing device further comprises a second circuit board on which the second card holder, the second interface, the baseband chip and the switch module are disposed, and when the wireless network accessing device is inserted into the interior of the intelligent terminal, the first circuit board and the second circuit board are in a same plane.

* * * * *